Figure 1:
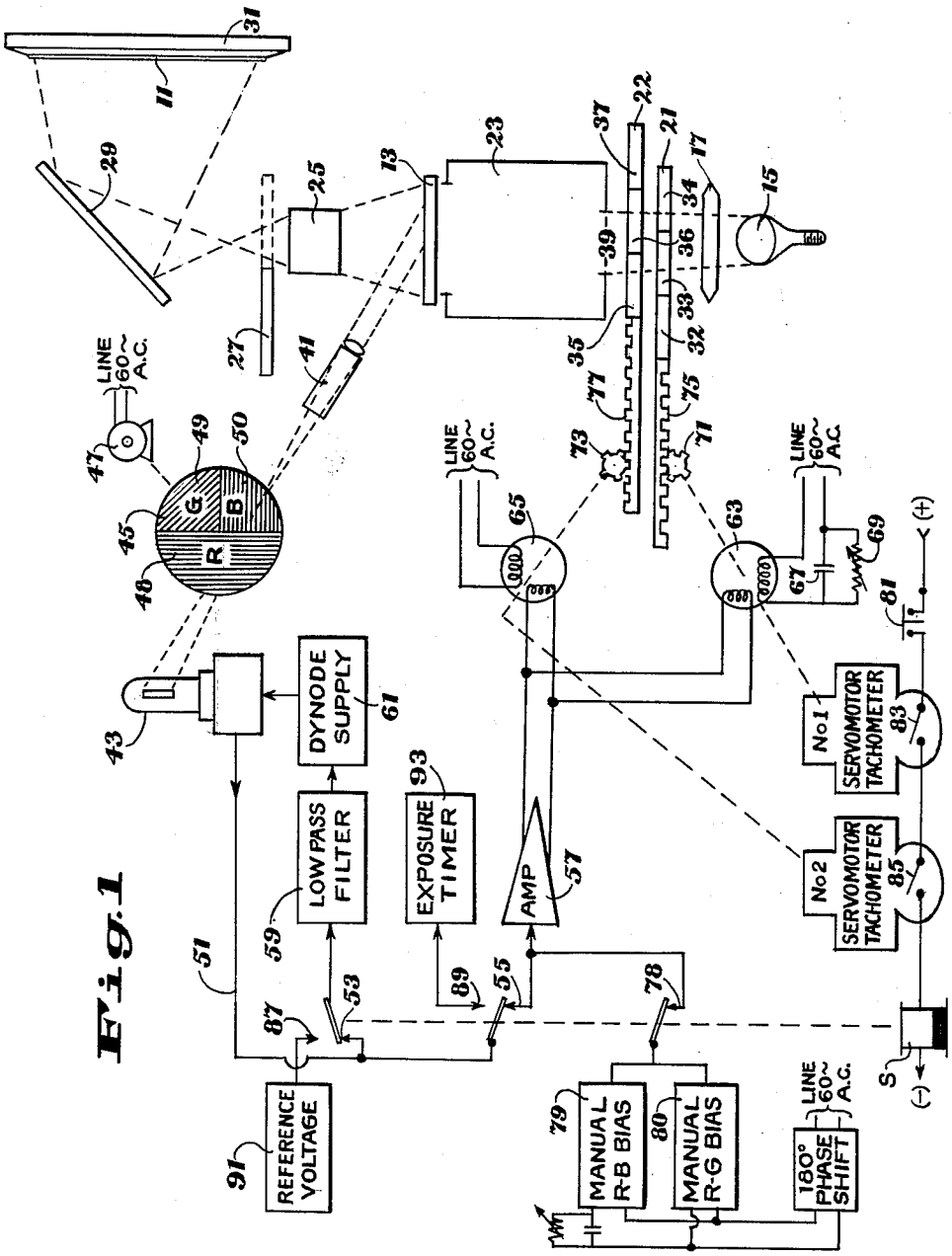

COLOR CORRECTION SIGNAL-SERVO CONTROL COMPONENTS

# United States Patent Office 3,161,108
Patented Dec. 15, 1964

3,161,108
PHOTOGRAPHIC COLOR REPRODUCTION
APPARATUS
William Modney, Rochester, N.Y., assignor to Eastman Kodak Company, Rochester, N.Y., a corporation of New Jersey
Filed Jan. 18, 1963, Ser. No. 252,414
12 Claims. (Cl. 88—24)

This invention relates to apparatus for reproducing photographic color records such as negatives and transparencies, and more particularly refers to apparatus for automatically modifying the spectral composition of a light source to control the color balance in a reproduction made from a color negative or transparency.

For psychological reasons, the human eye compensates for certain color changes in objects viewed. For instance, a white shirt is considered "white" by the viewer whether seen outside in bright or cloudy daylight, at early morning, high noon, or late evening, or inside under artificial illumination, in spite of the fact that the measurable color of the shirt under these varying conditions of illumination varies considerably. On the other hand, color sensitive films, when exposed to the light reflected from such a "white" shirt, will not compensate but rather will record the particular spectral composition of the reflected light at each of the particular times. Unfortunately, the amateur photographer is not aware of this psychological compensation on his part, and when he makes a photograph of a white shirt, he expects the shirt to appear a fairly neutral white in the photograph he has taken. The photographic industry is well aware of this problem and has for a long time been "correcting" color photographs so that the objects pictured therein will appear to the viewer to have an "acceptable" color. In actual practice, most color reproductions are balanced by the processor to assure that the skin tone of the human beings appearing in the picture will fall within an "acceptable" range of color variance.

Various prior art methods have been developed to provide apparatus for making color balance corrections. One basic method used to make "corrected" reproductions requires printing with three separate beams of red, green and blue light so that the intensities of these colors may be controlled as three independent variables. However, printing by this method wastes a great deal of light and either takes excessive time, if the beams are utilized sequentially, or requires very complex apparatus if the beams of light are utilized simultaneously. Therefore, it is often preferable to print with a single light beam which has its spectral composition adjusted by subtractive color filters of cyan, magenta, and yellow which control respectively, the red, green and blue components of the light source. The invention herein is an improvement in such printing device utilizing this last mentioned subtractive method of color correction.

In an article entitled "Filtering and Monitoring Systems for Color Printing" appearing in the periodical Photographic Science and Engineering (vol. 5, No. 6, Nov.-Dec., 1961), R. D. Calkins, R. W. G. Hunt, and E. K. Letzer describe a filter system utilizing two tripartite subtractive filters for controlling the spectral composition of a light source used for color printing. According to this method, the printer operator simultaneously adjusts each of the two filter units while watching the effective output of two independent sets of red, green, and blue monitoring phototubes. The outputs of two selected phototubes in each set are connected, respectively, by a switching arrangement to the opposite sides of a meter, and the operator changes the position of the appropriate filter unit until the meter indicates no difference in intensity between the two colors being monitored. Each filter unit is similarly monitored and adjusted. The invention herein provides novel apparatus which automatically and simultaneously adjusts the two filter units to provide the desired color balance, and this novel apparatus simplifies the cited system by eliminating five of the six phototubes as well as the necessity for switching controls.

According to the invention herein a light probe is used to pick out a particular spot on the negatives or transparencies being reproduced, e.g., a flesh-tone area, and directs the light from this spot through a spinning filter disk comprised of three filter sections which pass, respectively, only red, green and blue light. The light passed through the spinning filter disk impinges upon a photosensitive transducer, e.g. a photomultiplier, and the output of this transducer is amplified and fed simultaneously to two servomotors which control, respectively, the two tripartite subtractive filters. The spinning filter disk and the servomotors are all synchronously operated from a single power source. The output of the phototube transducer has two effective signal components: one of which varies in accordance with the color difference between a first and a second of the primary colors, while the other varies in accordance with the intensity difference between the first and the third primary colors. These two signal components are exactly 90° out of phase, and, since the reference winding of one of the servomotors is shifted 90° by means of an impedance network, the two servomotors react independently to each of the two signal components, thereby adjusting the position of the subtractive filters. In this manner color "correction" is accomplished automatically by modification of the spectral composition of the light which is to be passed through the negative or transparency for purposes of making the reproduction. After the desired color balance is achieved, the output of the single photomultiplier is switched to a conventional exposure timer and the actual printing operation takes place.

It is an object of this invention to provide a new and improved apparatus for the automatic monitoring of negatives or transparencies in color printing reproduction to cause the reproduction to be made with a preselected color balance.

It is a further object of this invention to provide color photographic reproduction apparatus utilizing only a single photosensitive detection device to produce a monitoring signal for both color balance and exposure control.

Another object is to provide apparatus for automatically analyzing the light passing through a particular portion of a negative or transparency and simultaneously adjusting a plurality of filters to modify the spectral composition of the light source of a photographic printer to achieve a predetermined color balance in the reproduction being made.

Yet another object is to provide a color monitoring system for use in photographic color reproduction apparatus in which a single photosensitive transducer may be used to monitor the color balance of the negative or transparency in spite of large variations in the over-all density of the negative, and the same transducer be used with an exposure timing device to determine exposure time of the reproduction.

Other objects, purposes and characteristic features of the present invention will be in part obvious from the accompanying drawings, and in part pointed out as the description of the invention progresses.

Figure 2:
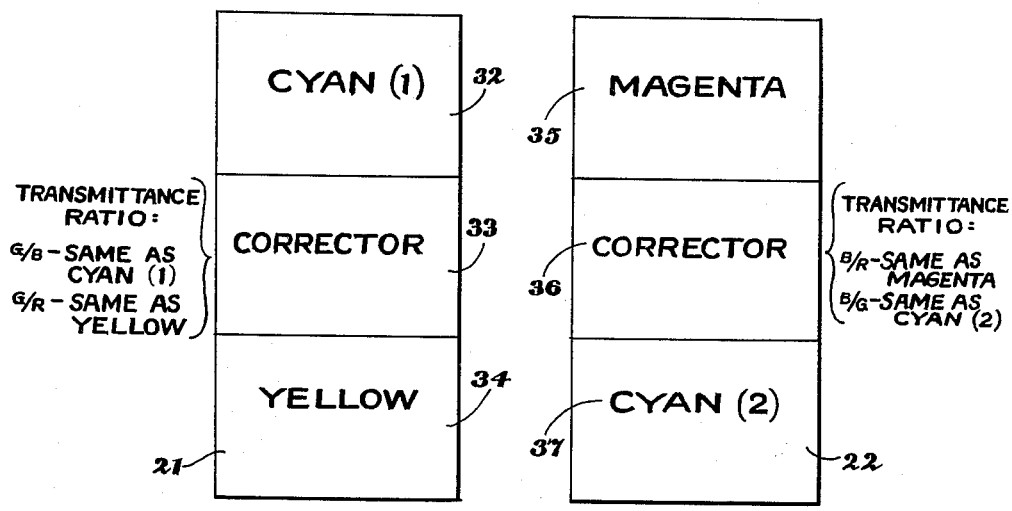
Figure 3:
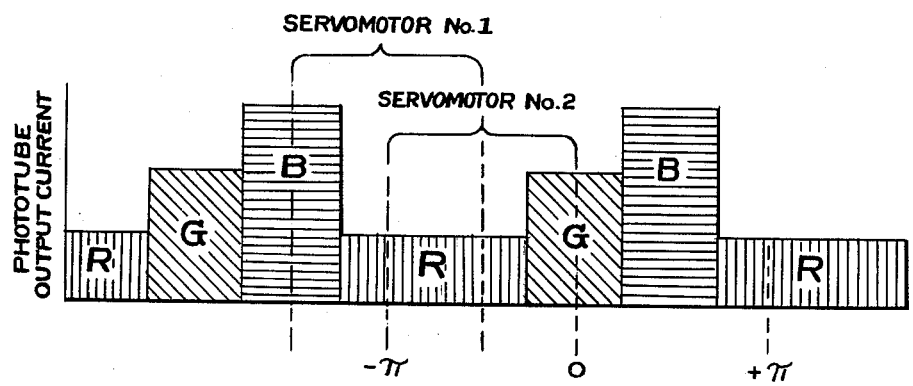

For the purpose of simplifying illustration and facilitating explanation, the various parts and circuits constituting the embodiment of the invention have been shown diagrammatically and certain elements have been left in block form, the drawings have been made more with the purpose of making it easy to understand the invention's principals and mode of operation than with the idea of illustrating the specific construction and arrangement of parts that would be employed in practice. The symbols (+) and (−) are employed to indicate the positive and negative terminals, respectively, of suitable batteries or other sources of direct current, and the circuits with which the symbols are used always have current flowing in the same direction. In describing the invention in detail, reference will be made to the accompanying drawings, in which like reference characters designate corresponding parts throughout the several views, and in which:

FIG. 1 is a combination block diagram and schematic illustration of the basic mechanical and electronic elements utilized in the particular embodiment of the invention disclosed herein;

FIG. 2 is a schematic representation of two possible tripartite subtractive color filters which may be used with the apparatus disclosed herein to modify the spectral composition of the light source; and FIG. 3 is a diagrammatic representation of one possible color correction signal that might be produced by the phototube in response to light received from a particular spot on a negative or transparency, the diagram also indicating the two 90° out-of-phase components of the signal which are utilized to drive the filter adjusting servomotors.

Duplicating Apparatus

Reference to FIG. 1, the right-hand portion illustrates conventional duplicating apparatus in which a photosensitive surface 11 is exposed to light which has been passed through a negative or transparency 13. The light emanates from a bulb 15 and passes sequentially through a heat absorber 17, two tripartite subtractive filters 21 and 22, and a light scrambler 23 prior to passing through negative 13. After the light has passed through negative 13, it is focused by lens 25, and when shutter 27 is moved from its normally blocking relation to the light path, the image is reflected from mirror 29 onto photosensitive surface 11 which is held in the light path against easel 31. Lens 25 and easel 31 are interconnected to permit the movement of easel 31 to positions of varying distance from mirror 29 according to the particular size reproduction that is desired.

Subtractive Filter Combination

While there are many possible combinations for filters 21 and 22, the following explanation will be limited to the particular combination illustrated diagrammatically in FIG. 2. Filter 21 is illustrated as being made up of three equal filter segments 32, 33, and 34, while filter 22 is similarly comprised of three equal filter segments 35, 36, and 37. The filter segments have dye or dichroic coverings, segment 32 passing cyan and absorbing or reflecting red, while segment 34 passes yellow and absorbs or reflects blue. The center or corrective segment 33 of filter 21 transmits a higher percentage of all colors than do either of the basic filter segments, but the ratio of its transmittance of green and blue light is the same as the ratio of the transmittance of green and blue light by cyan segment 32, while its transmittance ratio of green and red light is the same as the ratio of the transmittance of these two colors by yellow segment 34.

The entrance 39 to light scrambler 23 is no larger than any one of the filter segments, and so filter 21 blocks the light path with either of its end segments 32 or 34, or the combination of corrector segment 33 with either said end segment. It can be seen that whenever cyan segment 32 is fully or partially in the light path, only red light is controlled in accordance with the percentage of the area of opening 39 that is covered by cyan segment 32, since any change in the position of cyan segment 32 or corrector segment 33 will not alter the ratios of green or blue light passing through those filter segments to light diffuser 22. In the same manner, the green to red light ratio is unchanged when yellow filter 34 is fully or partially in the light path due to the fact that corrective filter 33 has the same green to red density difference as yellow filter 34, and so only the transmittance of blue light is affected by introduction of the yellow filter.

Segments 35 and 37 of subtractive filter 22 pass, respectively, magenta and cyan and control (by absorption or reflection), respectively, green and red light emanating from the light source 15. In the same manner as just explained above, corrector segment 36 has the same proportional transmission ratio to blue and red light as magenta segment 35 and a transmission ratio to the blue and green that is proportional to the blue and green transmission ratio of cyan segment 37. Therefore, movement of magenta segment 35 and corrector segment 36 into varying covering relations to entrance 39 of light scrambler 23 controls only the proportion of green light passing into scrambler 23, leaving the ratio of blue and red light unchanged, and the covering of entrance 39 by segment 37 and corrector segment 36 does not affect the blue to green light ratio but only changes the proportion of red light being passed on to negative 13.

By virtue of this filter arrangement, the proportion of red to blue light is controlled by the movement of filter 21 without affecting the proportion of green light passing through this filter. Similarly, the adjustment of filter 22 controls the proportion of red to green light without affecting the blue. Therefore, it is possible to adjust the ratio of red to blue light and the ratio of red to green light simultaneously. For instance, let it be assumed that the negative being monitored has more blue and green light than is permissible to obtain a desired "acceptable" color balance. Yellow segment 34 of filter 21 can be moved into the light path until it has cut off sufficient blue light to achieve the desired ratio of blue to red light. At the same time, since the proportion of green light passing through segments 33 and 34 remains unchanged at all settings of filter 21, the ratio of green to red light may be controlled by moving filter 22 until magenta segment 35 cuts down the green light by the desired amount. Since the adjustment of filter 22 causes no change in the proportion of blue light passing through it, the adjustment of filter 21 to control the blue to red ratio remains unaffected by the adjustment of filter 22. Thus, it can be seen that filters 21 and 22 may be adjusted simultaneously.

Novel Filter Control Apparatus

The lefthand portion of FIG. 1 illustrates schematically and in block form the elements of the novel apparatus for automatically adjusting the position of filters 21 and 22. Light probe 41 is adjusted to monitor a particular spot or area of negative 13, and light from this spot is focused by probe 41 to impinge upon photomultiplier 43 after passing through spinning filter disk 45, the latter being driven by motor 47 at a constant speed determined by the line frequency (e.g., 3600 r.p.m.). Spinning filter disk 45 is comprised of three filter segments: sector 48 which is 180° and passes only red light, sector 49 which is 90° and passes only green light, and sector 50 which is also 90° and passes only blue light. The output signal of photomultiplier 43, therefore, is a pulsating direct current, the alternating current component of which has the line frequency as its fundamental and is representative of the amounts of red, green and blue light being passed by the monitored portion of negative 13. One such possible signal is illustrated diagrammatically in FIG. 3.

The phototube output is passed along line 51 through back contacts 53 and 55 of relay S to a conventional amplifier 57 and low-pass filter 59. Low-pass filter 59 effectively controls the voltage level of the dynode supply 61 of photomultiplier 43 and performs the function of automatic gain control for the color monitoring circuit of the apparatus. Low-pass filter 59 allows only the D.-C. component of the phototube signal to pass to the dynode supply. If negative 13 is very dense, the D.-C.

component of the signal will be quite low. This causes the dynode supply to increase the dynode voltage of photomultiplier 43 and thereby increase the output signal. In this manner, during the color monitoring period the correction signal always has the same D.-C. magnitude regardless of the over-all density of the negative.

That portion of the output signal which is fed to amplifier 57 is amplified and delivered to the control winding of servomotors 63 and 65. The reference windings of servomotors 63 and 65 are both powered from the same (60 cycle) A.-C. line that drives motor 47, but the phase of the line signal is altered 90° in the case of servomotor 63 by the effect of the impedance of capacitor 67 and potentiometer 69. Therefore, the reference winding of servomotor 63 has the phase cos $\theta$ while the reference winding of servomotor 65 has the phase sin $\theta$.

A servomotor revolves in response to the component of the control winding signal that is 90° out-of-phase with the reference winding signal, while the component of the control signal that is in phase with the reference winding signal will not produce any rotating torque in the motor. As is shown mathematically below, the output signal of photomultiplier 43 contains two A.-C. components 90° out of phase. The sine component of this signal is proportional to the intensity difference of the red and blue light, while the cosine component is proportional to the intensity difference of the red and green light. Therefore, servomotor 63, whose reference winding has the phase cos $\theta$, will not react to the red-green component of the signal but only to the red-blue component. Similarly, servomotor 65 whose reference winding has the phase sin $\theta$ will not react to the red-blue component of the signal but only to the red-green component.

Servomotors 63 and 65 are mechanically connected, respectively, to filter units 21 and 22 by means of pinions 71 and 73 and racks 75 and 77. When the red portion of the red-blue signal component is greater, servomotor 63 drives pinion 71 in a clockwise direction to bring cyan segment 32 into the light path. Conversely, when the blue signal is greater, servomotor 63 drives pinion 71 counterclockwise to bring the yellow sector 34 into the light path. Servomotor 65 responds to the red-green signal to drive pinion 73 clockwise when the red signal is greater and counterclockwise when the green signal is greater.

In the event that the spot being monitored is to be reproduced as a neutral gray, the red, green and blue signals should be balanced to be equal. However, as is more often the case, the spot being monitored is a flesh tone and the desired color balance is achieved when some particular color mixture other than neutral gray is obtained. To achieve servomotor balance in situations where the desired color composition is not a neutral gray, the invention herein introduces a biasing counter-signal 180° out of phase with the control signal produced by photomultiplier 43. Such bias signals are represented as being delivered to amplifier 57 through back contact 78 of relay S. For instance, it may be assumed that, for the particular spot being monitored, an "acceptable" color balance may be achieved when the light passing through negative 13 is slightly more red than green, and slightly more green than blue. In such a case $R-B$ Bias 79 is adjusted to produce a weak red counter-signal, and $R-G$ Bias 80 is adjusted to provide weak counter-signals of both red and green, the former being of slightly greater magnitude. Due to this biasing signal, the control signals for servomotors 63 and 65 will indicate no intensity differences (and the servomotors will come to rest) when in fact the ratio of red-and-green to blue light being received by photomultiplier 43 is slightly greater than unity.

*Mathematical Proof*

The following Fourier series expansion shows that one servomotor will react only to the red-blue signal component, while the other servomotor reacts only to the red-green signal component. Considering one cycle of the signal extending from $-\pi$ to $+\pi$ (FIG. 3), the signal is defined by the following:

$$f(\theta) = R \text{ for } -\pi \text{ to } -\tfrac{1}{4}\pi$$
$$G \text{ for } -\tfrac{1}{4}\pi \text{ to } +\tfrac{1}{4}\pi$$
$$B \text{ for } +\tfrac{1}{4}\pi \text{ to } +\tfrac{3}{4}\pi$$
$$R \text{ for } +\tfrac{3}{4}\pi \text{ to } +\pi$$

The Fourier expansion is defined by:

$$f(\theta) = \frac{A_0}{2} + \sum_{n=1}^{\infty}[A_n \cos(n\theta) + B_n \sin(n\theta)]$$

where $$A_n = \frac{1}{\pi}\int_{-\pi}^{+\pi} f(\theta) \cos(n\theta) d\theta$$

$$B_n = \frac{1}{\pi}\int_{-\pi}^{+\pi} f(\theta) \sin(n\theta) d\theta$$

$$\frac{A_0}{2} = \frac{1}{2\pi}\int_{-\pi}^{+\pi} f(\theta) d\theta$$

By substitution of $f(\theta)$ from above definition of signal $$A_n = \frac{2}{n\pi}(G-R) \sin(\tfrac{1}{4}\pi n)$$

$$B_n = \frac{2}{n\pi}(R-B) \cos(\tfrac{1}{4}\pi n)$$

$$\frac{A_0}{2} = \tfrac{1}{2}R + \tfrac{1}{4}G + \tfrac{1}{4}B$$

The complete expansion is:

$$f(\theta) = (\tfrac{1}{2}R + \tfrac{1}{4}G + \tfrac{1}{4}B) + \sum_{n=1}^{\infty} \frac{2}{n\pi}(G-R)\sin(\tfrac{1}{4}\pi n)\cos(n\theta) + \frac{2}{n\pi}(R-B)\cos(\tfrac{1}{4}\pi n)\sin(n\theta)$$

By passing this signal through capacitor-coupled power amplifier 57, the D.C. component $(\tfrac{1}{2}R + \tfrac{1}{4}G + \tfrac{1}{4}B)$ is removed. When the signal is also passed through a filter that allows the fundamental ($n=1$) frequency to pass through the amplifier, the signal obtained from the amplifier output for delivery to the control windings of the servomotors is:

$$f(\theta) = \frac{1.41}{\pi}(G-R)\cos\theta + \frac{1.41}{\pi}(R-B)\sin\theta \quad n=1$$

This signal consists of two components 90° out-of-phase. The in-phase component is proportional to red-blue and the quadrature component is proportional to red-green. The servomotor whose reference winding has the phase cos $\theta$ will not react to the red-green component of the signal. It will react only to the red-blue component of this signal. Similarly, the servomotor whose reference phase is sin $\theta$ will react only to the red-green component of the signal.

*Exposure Timing Circuit*

One of the features of the invention herein is that photomultiplier 43 is not only used to provide the signals required for monitoring the color of the negative, but also provides the signal necessary for determining the exposure time of the negative once the proper spectral composition for the printing light has been achieved. The exposure timing of the negative is accomplished in the following manner:

Slow-acting relay S has a pickup circuit running from (+) through switches 81, 83 and 85, through the windings of relay S to (−). Switch 81 is closed at the beginning of each printing cycle and is not opened again until the shutter is closed by the exposure timing mechanism following completion of the printing cycle. Switches 83 and 85 close only when their respective servomotors 63 and 65 come to rest. It should be noted, however, that in the event that the motors reverse direction, momentarily coming to rest, relay S will not pick up due to its relatively slow action.

Once balance is achieved and servomotors 63 and 65 have reached their stable condition, switches 81, 83 and 85 are all closed and relay S picks up, opening its back contacts and closing front contacts 87 and 89. The opening of back contact 53 serves to remove the automatic gain control from photomultiplier 43 which now produces its signal at reference gain based upon reference voltage 91, the D.C. output of photomultiplier 43 now being proportional to the actual light intensity transmitted through the monitored spot on negative 13. This new signal from photomultiplier 43 is switched through front contact 89 of relay S to a conventional photoelectric exposure timer 93 which causes shutter 27 to be opened, permitting the image passing through lens 25 to be reflected from mirror 29 and focused onto photosensitive surface 11. As soon as the requisite exposure has been achieved (exposure time being determined in most conventional photoelectric exposure timers as a function inversely proportional to the D.C. current from the photosensitive transducer), exposure timer 93 moves shutter 27 back into blocking relation to the light path and, at the same time, opens switch 81. This causes relay S to drop away and returns the entire apparatus into condition for printing the next negative or transparency.

It should be understood that the disclosure herein presents only one simplified operable embodiment of the invention and omits practical modifications, adaptations, alterations and refinements that would be obvious to those skilled in the art to meet the requirements of practice. This simplification has been done merely to facilitate the disclosure of the invention and should in no way be considered to define the limits or scope of the invention.

What is claimed is:

1. In apparatus for making photographic color reproductions, said apparatus having a light source of sufficient intensity to provide exposure of a preselected photosensitive surface after said light has passed sequentially through (a) two movable multi-color filters capable of modifying the proportion of the three primary colors in light passed therethrough, (b) light diffusing means, (c) the photographic record being reproduced, and (d) a lens, the improvement comprising: signal means selectively responsive to light of each primary color passed through said record for producing a signal having two distinct components, one of said signal components varying in accordance with the difference in intensity between a first and a second primary color, and the other of said signal components varying in accordance with the difference in intensity between said first primary color and the third primary color; and filter adjusting means responsive to said signal for adjusting at least one of said movable filters until each of said signal components assumes a predetermined value, whereby the spectral composition of said light source is modified to provide color balance in said reproduction.

2. The photographic apparatus according to claim 1 wherein said signal means comprises a photosensitive transducer; a spinning multi-sectored filter disk; and scanning means adjustably responsive to light passing through a selected portion of said photographic record for causing said light to be directed through said filter disk to impinge on said transducer.

3. The photographic apparatus according to claim 2 wherein said spinning disk is comprised of three filter sectors, each sector respectively passing only one primary color.

4. The photographic apparatus according to claim 3 wherein the sector passing said first primary color is 80°, and the other two sectors passing, respectively, said second and third primary colors are each 90°.

5. The apparatus according to claim 1 wherein one said movable filter controls only said first and second primary colors and the other said movable filter controls only said first and third primary colors, and wherein said filter adjusting means comprises two servomotors which drivingly engage, respectively, each said movable filter, each said servomotor being respectively responsive to one of said signal components for causing said associated filter to move in one of two directions according to whichever primary color intensity is greater as indicated by said respective signal component.

6. The photographic apparatus according to claim 1 wherein said signal means further comprises bias means responsive to a preselected setting for altering said signal components to cause said filter to be adjusted to provide a preselected color imbalance.

7. In photographic apparatus for making reproductions in color, said apparatus having
    a light source;
    first and second adjustable tripartite filters for modifying the spectral composition of light emanating from said source,
        said first filter controlling a first and second primary color, and
        said second filter controlling said first and the third primary color; and
    means for scrambling said filter light, directing it along a predetermined path through a color negative or transparency, and focusing said light on a photosensititve surface,
the improvement comprising:
    signal means responsive to light passed through said negative or transparency for producing a signal having two distinct components,
        one of said signal components varying in accordance with the difference in intensity between said first and second primary colors, and
        said other of signal components varying in accordance with the difference in intensity between said first and third primary colors;
    automatic gain control means responsive to said signal for causing said signal to remain at a relatively constant average amplitude regardless of the over-all density of said negative or transparency; and
    first and second filter adjusting means responsive, respectively, to each of said signal components for positioning said first and second filters until the spectral composition of said filter light is modified to provide a preselected color balance in the reproduction.

8. The apparatus according to claim 7 wherein said signal means comprises
    a phototube;
    a spinning multi-sectored filter disk; and
    scanning means adjustably responsive to light passing through a selected portion of said negative or transparency for causing said light to be directed through said filter disk to impinge on said phototube;
    said signal is a pulsating direct current and said signal components are alternating current signals;
    said automatic gain control means is responsive only to the direct current portion of said signal for causing the gain of said phototube to be increased in proportion to any drop in the level of said direct current signal below a predetermined value; and
    said first and second filter adjusting means comprise a pair of servomotors in driving engagement, respectively, with said first and second filters.

9. The apparatus according to claim 8 wherein said apparatus also comprises:
    a shutter intermediate said negative and said photosensitive surface in normally blocking relation to said light path;

exposure control means responsive to said signal for moving said shutter out of said blocking relation for a time period which varies in accordance with said signal; and switch means responsive to said filter adjusting means for causing said signal to be passed to said exposure control means only when said filters have been adjusted by said filter adjusting means to provide said preselected color balance.

10. The apparatus according to claim 7 wherein said signal means further comprises bias means responsive to a preselected setting for producing a counter-signal to vary at least one of said signal components whereby the adjustment of said filter is altered in accordance with said preselected setting.

11. The apparatus according to claim 9 wherein said switch means comprises:
first and second switch closing means responsive, respectively, to each said servomotor;
switch contacts disposed in relation to each said closing means being moved, respectively, into a closed position only when each said servomotor is stopped;
a slow-action relay; and
circuit means connecting a current source to said relay through said switch contacts.

12. Photographic apparatus for making reproductions in color, said apparatus having
a light source;
first and second adjustable tripartite filters for modifying the spectral composition of light emanating from said source,
said first filter controlling a first and a second primary color; and
said second filter controlling said first and the third primary color; and
means for scrambling said filtered light, directing it along a predetermined path through a color negative or transparency, and focusing said light onto a photosensitive surface and
a shutter intermediate said negative and said photosensitive surface in normally blocking relation to said light path;
the improvement comprising:
a phototube;
a spinng filter disk having three filter sectors, each sector passing, respectively, only one primary color, one said sector being 180° and passing only said first primary color, and said two other sectors being each 90° and passing, respectively, said second and third primary colors;
scanning means responsive to light passing through a selected portion of said negative for causing said light to be directed through said filter disk to impinge on said phototube;
whereby said phototube produces a pulsating direct current signal having two distinct alternating current components, one of said signal components varying in accordance with the difference in intensity between said first and second primary colors, and the other of said signal components varying in accordance with the difference in intensity between said first and third primary colors;
automatic gain control means responsive only to the direct current portion of said signal for causing said signal to remain at a relatively constant average amplitude regardless of the measurable density of said negative or transparency;
a pair of servomotors in driving engagement, respectively, with said first and second filters and responsive, respectively, to each of said alternating current signal components for positioning said first and second filters until the spectral composition of said filtered light is modified to provide a preselected color balance in the reproduction; and exposure control means responsive to said signal for moving said shutter out of said blocking relation for a time period varying in accordance with said signal; and
switch means responsive to the movement of said servomotors for causing said signal to be passed to said exposure control means only when said first and second filters have been adjusted by said servomotors to provide said preselected color balance.

References Cited in the file of this patent
UNITED STATES PATENTS

| | | |
|---|---|---|
| 3,083,614 | Veit | Apr. 2, 1963 |
| 3,100,419 | Clapp | Aug. 13, 1963 |